United States Patent
Huynh (10) Patent No.: US 12,407,426 B2
(45) Date of Patent: Sep. 2, 2025

(54) PROBES FOR DEVICE TESTING

(71) Applicant: LitePoint Corporation, San Jose, CA (US)

(72) Inventor: Minh-Chau Huynh, San Diego, CA (US)

(73) Assignee: LITEPOINT CORPORATION, San Jose, CA (US)

(*) Notice: Subject to any disclaimer, the term of this patent is extended or adjusted under 35 U.S.C. 154(b) by 482 days.

(21) Appl. No.: 17/743,218

(22) Filed: May 12, 2022

(65) Prior Publication Data

US 2023/0370174 A1 Nov. 16, 2023

(51) Int. Cl.
*H04B 17/10* (2015.01)
*H04B 7/0413* (2017.01)
*H04B 17/14* (2015.01)
*H04B 17/318* (2015.01)

(52) U.S. Cl.
CPC ......... *H04B 17/102* (2015.01); *H04B 7/0413* (2013.01); *H04B 17/14* (2015.01); *H04B 17/318* (2015.01)

(58) Field of Classification Search
CPC .... H04B 17/102; H04B 7/0413; H04B 17/14; H04B 17/318
See application file for complete search history.

(56) References Cited

U.S. PATENT DOCUMENTS

| | | | |
|---|---|---|---|
| 7,484,146 B2 | 1/2009 | Olgaard et al. | |
| 7,564,896 B2 | 7/2009 | Olgaard | |
| 7,567,521 B2 | 7/2009 | Olgaard et al. | |
| RE42,672 E | 9/2011 | Stutzman et al. | |
| 8,312,329 B1 | 11/2012 | Yellapantula et al. | |
| 8,811,461 B1 | 8/2014 | Huynh | |
| 8,879,659 B1 | 11/2014 | Olgaard | |
| 8,917,761 B2 | 12/2014 | Huynh | |
| 9,077,535 B2 | 7/2015 | Olgaard | |
| 9,749,097 B2 | 8/2017 | Yellapantula et al. | |
| 9,794,009 B1 | 10/2017 | Olgaard et al. | |
| 9,923,647 B1 | 3/2018 | Olgaard et al. | |
| 10,009,126 B2 | 6/2018 | Olgaard et al. | |
| 10,079,626 B1 | 9/2018 | Olgaard et al. | |
| 10,536,226 B1 | 1/2020 | Huynh et al. | |
| 10,666,542 B1 | 5/2020 | Olgaard et al. | |
| 10,819,616 B2 | 10/2020 | Olgaard et al. | |
| 11,454,662 B1 | 9/2022 | Huynh | |

(Continued)

OTHER PUBLICATIONS

Ivanov et al "Implementation of antenna near-field scanning without using probe position sensors", 2015 International Siberian Conference on Control and Communication, May 21-23, 2015 (Year: 2015).*

(Continued)

*Primary Examiner* — Sun Jong Kim
(74) *Attorney, Agent, or Firm* — ArentFox Schiff LLP (57) ABSTRACT

A system is configured to test a device. The device is or includes a MIMO wireless device having antennas. The antennas include at least two antennas for receiving or transmitting. The system includes a test instrument and probes having wired connections to the test instrument over which signals are communicated between the probes and the test instrument. A probe is configured to communicate signals with an antenna on the device wirelessly in a reactive near-field region of the antenna.

32 Claims, 9 Drawing Sheets

(56) References Cited

U.S. PATENT DOCUMENTS

| | | | |
|---|---|---|---|
| 2002/0180473 A1* | 12/2002 | Di Stefano | G01R 1/06738 |
| | | | 324/755.07 |
| 2005/0099191 A1* | 5/2005 | Gleason | G01R 1/06772 |
| | | | 324/755.01 |
| 2005/0162177 A1* | 7/2005 | Chou | G01R 1/06761 |
| | | | 324/755.02 |
| 2007/0070691 A1 | 3/2007 | Olgaard et al. | |
| 2007/0070881 A1 | 3/2007 | Olgaard et al. | |
| 2007/0268190 A1 | 11/2007 | Huynh | |
| 2008/0172588 A1 | 7/2008 | Olgaard | |
| 2008/0266194 A1 | 10/2008 | Huynh | |
| 2010/0123471 A1 | 5/2010 | Olgaard et al. | |
| 2010/0328164 A1 | 12/2010 | Huynh | |
| 2011/0279330 A1 | 11/2011 | Huynh | |
| 2012/0051224 A1 | 3/2012 | Olgaard et al. | |
| 2012/0113829 A1 | 5/2012 | Olgaard et al. | |
| 2012/0269288 A1 | 10/2012 | Olgaard et al. | |
| 2013/0141303 A1 | 6/2013 | Huynh | |
| 2013/0188678 A1 | 7/2013 | Olgaard et al. | |
| 2013/0295858 A1 | 11/2013 | Olgaard et al. | |
| 2013/0301694 A1 | 11/2013 | Olgaard | |
| 2014/0062801 A1 | 3/2014 | Yong et al. | |
| 2014/0266929 A1 | 9/2014 | Huynh et al. | |
| 2014/0266930 A1 | 9/2014 | Huynh | |
| 2014/0269871 A1 | 9/2014 | Huynh | |
| 2014/0273873 A1 | 9/2014 | Huynh | |
| 2015/0063133 A1 | 3/2015 | Olgaard et al. | |
| 2015/0078196 A1 | 3/2015 | Olgaard | |
| 2015/0288042 A1 | 10/2015 | Huynh | |
| 2017/0365926 A1* | 12/2017 | Kishimoto | H01Q 5/50 |
| 2018/0062971 A1* | 3/2018 | Kyosti | H04L 43/50 |
| 2018/0337738 A1* | 11/2018 | Wen | H04B 17/309 |
| 2019/0190624 A1* | 6/2019 | Kyosti | H04B 7/0413 |
| 2020/0021370 A1* | 1/2020 | Huynh | G01R 29/10 |
| 2022/0045429 A1* | 2/2022 | Harel | H01Q 5/48 |
| 2022/0308107 A1* | 9/2022 | Hesselbarth | G01R 31/3025 |
| 2023/0058324 A1 | 2/2023 | Yellapantula et al. | |
| 2023/0258702 A1 | 8/2023 | Huynh et al. | |
| 2023/0370174 A1 | 11/2023 | Huynh | |

OTHER PUBLICATIONS

Wikipedia, "Near and Far Field," Wikipedia.org [online] URL:https://en.wikipedia.org/wiki/Near_and_far_field#Near-field_characteristics, retrieved on Nov. 29, 2023, 12 pages.

Unknown, "RF Absorbers—RF Absorber Sheet-RF Microwave Absorber-Pyramidal Foam Absorber", Ecotone, Available online at: <https://www.rfchambers.com/rf-absorbers.html>, Mar. 26, 2025, pp. 1-8.

* cited by examiner

PROBES FOR DEVICE TESTING

TECHNICAL FIELD

This specification describes examples of systems that use probes to test devices having multiple transmitters and multiple receivers.

BACKGROUND

Multiple-input multiple-output (MIMO) devices use multiple transmitters to transmit data and multiple receivers to receive data. Testing MIMO devices can be challenging due to signal crosstalk among the transmitters and receivers.

SUMMARY

The example systems described herein use relatively small near-field (NF) probes, which may be electrical or magnetic, to couple to antennas of a device under test (DUT). The probes are configured to transmit and to receive electromagnetic signals in the reactive near-field regions of the DUT antennas. The probes can be used for downlink multiple-input multiple-output (MIMO) device testing where the DUT antennas receive test signals from the probes, and for uplink MIMO testing where the probes receives signals from the DUT antennas.

The example probes described herein may reduce, inhibit, or prevent crosstalk among the DUT antennas during testing since, in some implementations, a probe only couples strongly, or transmits strongly, to a DUT antenna that is nearest to the probe and does not couple strongly, or transmit strongly, to other DUT antennas that are farther away from the probe. The probes thus guide DUT signals directly to respective receive MIMO antennas (direct streams) while reducing signal transmission to other receiving antennas (cross streams). The resulting MIMO channel matrix becomes similar to that obtained using conducted testing. Since MIMO antenna locations on a DUT are known by design, probe placement relative to the antennas can be determined based on the location of the antennas' reactive near-field regions, which are known or can be calculated based on attributes of the antennas. If MIMO antenna locations on a DUT are not known, the DUT can be scanned using a radio frequency (RF) scanner to determine appropriate or probe placement relative to the DUT.

In addition to addressing crosstalk, another possible advantage of testing using the probes described herein is that device testing can be performed in a relatively small space, since the probes can be placed very near the DUT and additional MIMO streams can be accommodated without increasing the size of the space.

Thus, when used in a test system, the probes may produce a reliable MIMO channel matrix over the air that addresses issues with testing MIMO systems.

Described herein is an example system for testing a device. The device is or includes a MIMO wireless device having antennas. The antennas include at least two antennas for receiving or transmitting. The system includes a test instrument and probes having wired connections to the test instrument over which signals are communicated between the probes and the test instrument. A probe among the probes is configured to communicate signals with an antenna on the device wirelessly in a reactive near-field region of the antenna. The system may include one or more of the following features, either alone or in combination.

The probes may include at least two probes configured to communicate with the at least two antennas. The test instrument may be configured to send test signals to the at least two probes configured to communicate with the at least two antennas. The test instrument may be configured to receive responses to test signals from the at least two probes configured to communicate with the at least two antennas.

The probe may include multiple arms configured so that, when positioned for communication with the antenna, a first arm of the probe is closer to the antenna than a second arm of the probe. At least part of the first arm may be exposed relative to the second arm such that the at least part of the first arm is not covered by at least part of the second arm. The first arm may be at least partly serpentine in shape.

The first arm may be configured for positioning adjacent to the antenna. A dimension of the first arm along a length of the antenna may be longer than a corresponding dimension of the second arm. The first arm may be in a first plane and the second arm may be in a second plane that is separate from the first plane. The probe may include a conductor that is connectable between the first arm and a signal feed line, but that is isolated electrically from the second arm. The first plane and the second plane may be substantially parallel to each other. The first plane and the second plane may be at an oblique angle to each other.

A combined length of the first arm and the second arm may be a length that is less than ½ of a wavelength or less of a signal that the probe communicates with the antenna. The probe may include a substrate and conductive metal embedded in the substrate. The first and second arms may be made of the conductive metal. The substrate may have a dielectric constant of 3 or less.

The probe may be positioned relative to the antenna within the reactive near-field region based on a least one of a transmission frequency of the antenna or a type of the antenna. The probes may be part of or include an array of probes configured to communicate signals with the antennas on the device wirelessly in a reactive near-field region of the antennas. The probes may be or include an array of probes configured to communicate signals with one of the antennas on the device wirelessly in a reactive near-field region of the one of the antennas. The system may include a switch for selecting a probe in an array or probes. The test instrument may be configured to select, via the switch, a probe in the array by controlling the switch based on a frequency of communication to or from one of the antennas.

One or more of the probes may be configured for movement relative to the antenna. The test instrument may be configured to control movement of the probe based on a frequency of communication to or from the antenna. The system may include a microelectromechanical system (MEMS) actuator to which a probe is connected. The mems actuator may be controllable by a control system to control movement of the probe. Probes may be controlled to move individually or as a group.

The MIMO device may include a ground plane. The first arm may be sized so as to cover at least part of the antenna but not extend over the ground plane. The probe may include or be part of a structure having dimensions that are based on a wavelength of a signal transmitted to, or from, the probe. The probe may be sized based on locations of the antennas on the device such that communication between the probe and the antenna within the reactive near-field region inhibits wireless crosstalk between the probe and another antenna on the device. Signals may be communicated between the probes and the MIMO device over a static channel.

An example probe includes arms having conductive metal. The arms may be for communicating signals with an antenna on a DUT wirelessly in a reactive near-field region of the antenna. The arms include a first arm configured for placement adjacent to at least part of the antenna to communicate the signals with the antenna wirelessly. The first arm may be configured for connection to a signal feed line. The arms include a second arm connected electrically to ground and physically away from the first arm. The second arm is for operating as an electrical return for the first arm. The second arm is configured for connection to an electrical ground. The example probe may include one or more of the following features, either alone or in combination.

The first arm may be in a first plane and the second arm may be in a second plane that is separate from the first plane. The second arm may be configured so that, when the first arm is adjacent to the at least part of the antenna, the second arm is farther away from the antenna than the first arm. At least part of the first arm may be exposed relative to the second arm such that the at least part of the first arm is not covered by at least part of the second arm. The first arm may be at least partly serpentine in shape. A combined length of the first arm and the second arm may be a length that is less than ½ of a wavelength or less of a signal that the probe communicates with the antenna.

The probe may include a substrate and the conductive metal arms may be embedded in the substrate. The substrate may have a dielectric constant of 4 or less, or of 3 or less. The probe may be dipole. The first arm may correspond to a first pole and the second arm may correspond to a second pole.

The first arm may be in a first plane and the second arm may bin a second plane that is separate from the first plane. The probe may include a conductor that is connectable between the first arm and a signal feed line. The first plane and the second plane may be substantially parallel to each other. The first plane and the second plane may be at an oblique angle to each other.

Any two or more of the features described in this specification, including in this summary section, may be combined to form implementations not specifically described in this specification.

The various systems described herein, or portions thereof, may be control, at least in part, via a computer program product that includes instructions that are stored on one or more non-transitory machine-readable storage media and that are executable on one or more processing devices (e.g., microprocessor(s), application-specified integrated circuit (s), programmed logic such as field programmable gate array(s), or the like). The systems described herein, or portions thereof, may be implemented as one or more apparatus or a method and may include one or more processing devices and computer memory to store executable instructions to implement control of the various functions. The apparatus, systems, method, and/or components described herein may be configured, for example, through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
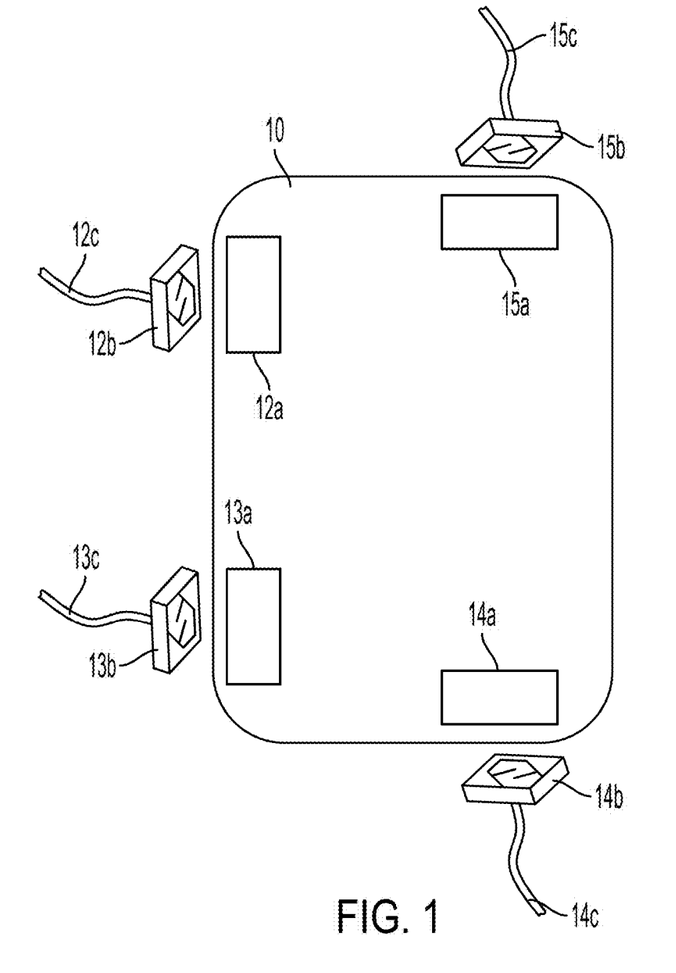
FIG. 1 is a block diagram showing an example device under test (DUT) and example probes arranged relative to antennas on the DUT.

Described herein example implementations of test processes and test systems, such as automatic test equipment (ATE), that are used and configured to test multiple-input multiple-output (MIMO) wireless devices. FIG. 1 shows an example of an example MIMO device 10. MIMO device 10 has a 4×4 configuration and includes four antennas 12a to 15a. Each of antennas 12a to 15a may be configured for use as a transmitting antenna or a receiving antenna. A transmitting antenna transmits, or outputs, radio frequency (RF) signals from the MIMO device. A receiving antenna inputs, or receives, RF signals from an external RF source. When transmitting data, the same data stream is sent on all four antennas at the same time. When receiving data, all four antennas are used to receive the same data stream. An example benefit of a MIMO configuration is that it may improve reliability since the antennas aim in different directions.

In some examples, a MIMO device may be configured to include at least two/two or more antennas, each of which may be configured and used as a transmitting antenna or a receiving antenna; however, other MIMO devices may have more than two of these types of antennas. An example of a MIMO device is an 802.11be Wi-Fi integrated circuit (chip); however, any type of MIMO device may be tested using the techniques described herein. The techniques described herein may be used to test a static communication channel of a DUT antenna where expected behavior is known, rather than in a fading channel used to simulate a device working environment. The techniques described herein may also be used to test non-MIMO devices.

The example test systems include probes 12b to 15b that are each configured for placement in the reactive near-field region a respective one of antennas 12a to 15a. The reactive near-field region of an antenna is a region that is adjacent to the antenna. The outer boundary of a reactive near field region may be defined as $1/(2'\pi)$ of the signal wavelength, or 0.159 of the signal wavelength, where the signal wavelength refers to the wavelength of the signal transmitted from, or received by, the antenna.

Wikipedia.com provides an example explanation of the reactive near-field region, which is as follows. "In the reactive near field (very close to the antenna), the relationship between the strengths of the E and H fields is often too complicated to easily predict, and difficult to measure. Either field component (E or H) may dominate at one point, and the opposite relationship dominate at a point only a short distance away. This makes finding the true power density in this region problematic. This is because to calculate power, not only E and H both have to be measured but the phase relationship between E and H as well as the angle between the two vectors must also be known in every point of space.

In this reactive region, not only is an electromagnetic wave being radiated outward into far space but there is a reactive component to the electromagnetic field, meaning that the strength, direction, and phase of the electric and magnetic fields around the antenna are sensitive to EM absorption and re-emission in this region, and respond to it. In contrast, absorption far from the antenna has negligible effect on the fields near the antenna, and causes no back-reaction in the transmitter.

Very close to the antenna, in the reactive region, energy of a certain amount, if not absorbed by a receiver, is held back and is stored very near the antenna surface. This energy is carried back and forth from the antenna to the reactive near field by electromagnetic radiation of the type that slowly changes electrostatic and magnetostatic effects. For example, current flowing in the antenna creates a purely magnetic component in the near field, which then collapses as the antenna current begins to reverse, causing transfer of the field's magnetic energy back to electrons in the antenna as the changing magnetic field causes a self-inductive effect on the antenna that generated it. This returns energy to the antenna in a regenerative way, so that it is not lost. A similar process happens as electric charge builds up in one section of the antenna under the pressure of the signal voltage, and causes a local electric field around that section of antenna, due to the antenna's self-capacitance. When the signal reverses so that charge is allowed to flow away from this region again, the built-up electric field assists in pushing electrons back in the new direction of their flow, as with the discharge of any unipolar capacitor. This again transfers energy back to the antenna current.

Because of this energy storage and return effect, if either of the inductive or electrostatic effects in the reactive near field transfer any field energy to electrons in a different (nearby) conductor, then this energy is lost to the primary antenna. When this happens, an extra drain is seen on the transmitter, resulting from the reactive near-field energy that is not returned. This effect shows up as a different impedance in the antenna, as seen by the transmitter." https://en.wikipedia.org/wiki/Near_and_far_field#Near-field_characteristics (accessed May 11, 2022).

The reactive field dominates in the reactive near-field region. In this region, the electric and magnetic fields are 90° out of phase with each other and the angular field distribution is highly dependent upon the distance from, and direction relative to, the antenna. In the reactive near-field region, the electric field at a point in space where a probe is located is the result of electric charges built up in a nearby section of the antenna. Similarly, a local magnetic field is caused by a current flowing (electrons moving) in a nearby section of the antenna. Charges and electrons present in the nearby section of the antenna contribute to localized electric and magnetic fields in the reactive near-field region. These charges and electrons present in the nearby section of the antenna do not contribute to such fields in a significant way for areas further away from the antenna, such as areas greater than $1/(2*\pi)$ of the signal wavelength For some antennas, such as those on MIMO devices, the reactive near-field region is within a single-digit millimeters (mm) location from the antenna. Example reactive near-field regions of an antenna may be 9 mm, or less from the antenna, 8 mm, or less from the antenna, 7 mm, or less from the antenna, 6 mm, or less from the antenna, 5 mm, or less from the antenna, 4 mm, or less from the antenna, 3 mm, or less from the antenna, 2 mm, or less from the antenna, or 1 mm, or less from the antenna. Other antennas may have reactive near-field regions that are at different distances than those listed. The size of the reactive near-field region of an antenna—for example, how far that region extends from the antenna and in what directions—may be based on the antenna's size, configuration, and/or the strength of the signals that it is configured to transmit or to receive. The distance may be a linear distance, one or more radii relative to the antenna, or define an irregular volume that extends outwardly from the antenna.

Communication between a probe and an antenna within the reactive near-field region may inhibit or prevent wireless crosstalk between the probe and another antenna on the device. More specifically, crosstalk includes interference resulting from RF signals from, or to, two antennas mixing together. By placing the probe in the reactive near-field region of an antenna, the probe may be subjected only to RF signals from that antenna without interfering signals from nearby antenna(s) and/or probe(s). Likewise, RF signals from the probe to the antenna in the reactive near-field region of an antenna may not interfere with RF signals from nearby antenna(s) and/or probe(s). As a result, the use of the probes described herein may inhibit or prevent crosstalk.

The probes may be made of one or more types of conductive metal, such as copper or gold. The probes are configured to transmit signals to a DUT's antennas such as antennas 12*a* to 15*a* of device 10 and to receive signals from the DUT's antennas such as antennas 12*a* to 15*a* of device 10. In some examples, the probes are dipole devices in which electrons injected into the probe by current from a signal feed line, such as feed line 15C, radiate outward and follow the reactive near field of the nearby antenna. These electrons induce a corresponding current in the nearby antenna, thereby completing the signal transfer. Likewise, a signal output from a nearby antenna similarly induces a current in the nearby probe.

Figure 2:
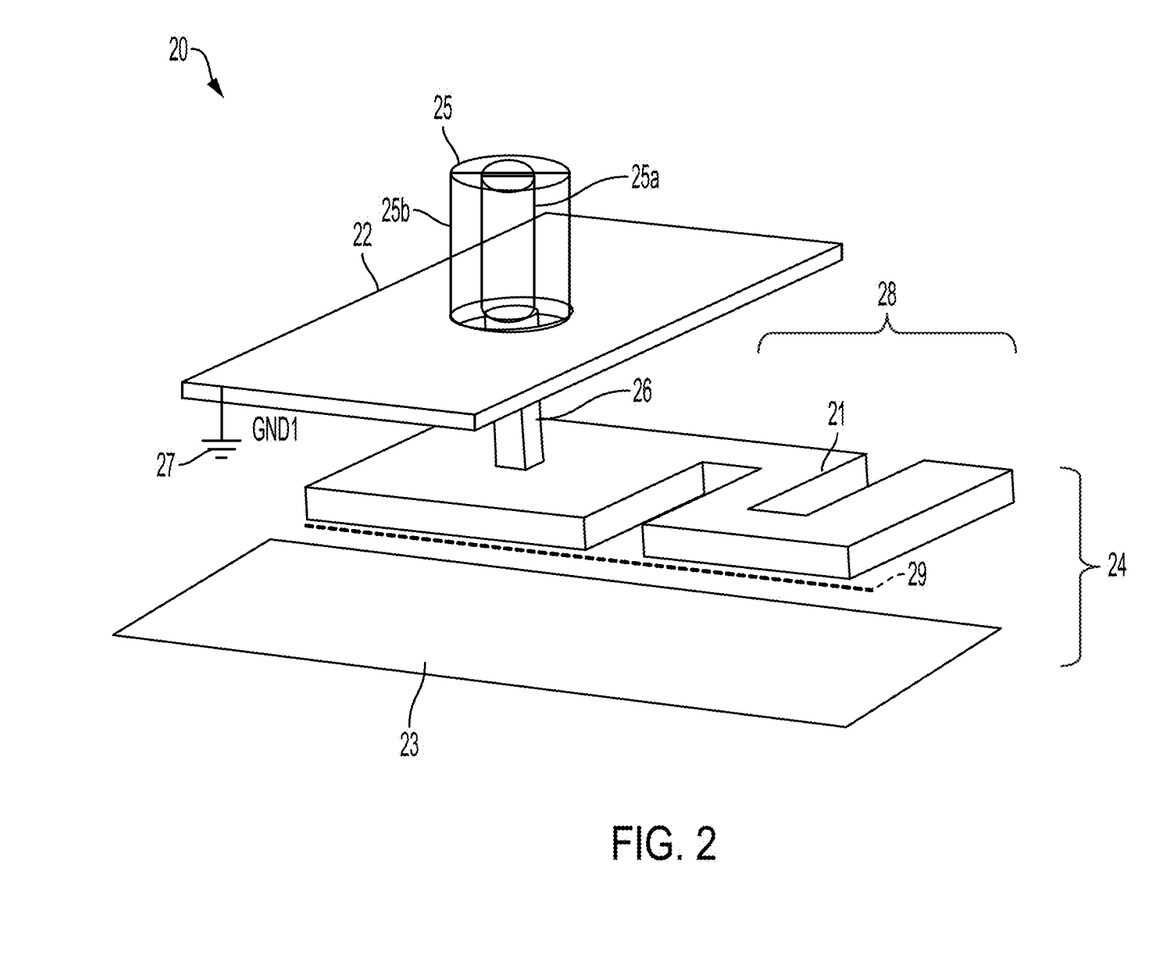
FIG. 2 is a perspective view of an example probe.

Each of probes 12*b* to 15*b* may have the same configuration—for example, the same shape, size, and/or composition, although in some implementations different probes may have different configurations. An example configuration for the each of the probes is shown in FIG. 2. Probe 20 includes arms 21 and 22.

First arm 21 is configured for placement adjacent to at least part of an antenna 23 and in the antenna's reactive near-field region 24 to communicate signals with the antenna wirelessly. First arm 21 is configured for connection to a signal feed line 25 of the test system through conductor 26, which electrically connects to first arm 21 but which is electrically insulated from second arm 22, e.g., via a dielectric material (not shown in the Figure). The signal feed line 25 can be a coaxial cable having an inner conductor wire 25*a* and an outer conductor wire 25*b* separated by a dielectric material, with the inner conductor wire 25*a* electrical connected to first arm 21 through conductor 26, and the outer conductor 25*b* electrically connected to second arm 22. Signal from an antenna may be transmitted wirelessly to probe 20 by electromagnetic induction and then through the feed lines 25 to a test instrument. Signals from the test instrument may be transmitted wirelessly to the antenna by electromagnetic induction through feed lines 25 and the probe 20 First arm 21 is at least partially serpentine, bent or meandering in the example shown in FIG. 2. First arm 21 is so shaped in order to increase the length of first arm 21, where the length is measured along, and taking into account, the curvature of the first arm (not by line 29). Increasing the length of first arm 21 increases the electrical path length of the probe and, therefore, may improve the probe's ability to conduct wireless signals either to antenna 23 or from antenna 23. Making at least part of first arm 21 serpentine, bent or meandering enables the length of first arm 21 to be increased without increasing the overall length 29 of probe 20.

Second arm 22 is connected electrically to the coaxial outer conductor 25b, but second arm is electrically insulated from first arm 21, e.g., by the dielectric material. Second arm 22 is physically set back or away from first arm 21 and, thus, second arm 22 is farther away from the antenna 23 than first arm 21 when the probe is in position to communicate with antenna 23. Second arm 22 is configured to operate as an electrical return for first arm 21. As such second arm is connected to an electrical ground 27. In this example, second arm 22 has a rectangular planar shape; however, the probe is not limited to use with this shape for the second arm. For example, the second arm may have a linear shape or non-rectangular shape. In some implementations, a combined length of the first arm and the second arm is less than 1/10 of a wavelength of a signal that probe 20 communicates with antenna 23. This length constraint may reduce the chance of signals feeding back into the probe and not propagating from the probe. In some implementations, at least part 28 of the first arm 21 is exposed relative to second arm 22 over part of antenna 23. For example, at least part 28 of first arm 21 is not covered by all or part of second arm 22 over part of antenna 23. This configuration may improve the chances of the first arm picking-up wireless signals from antenna.

In some implementations, first arm 21 and second arm 22 are in planes that are parallel to each other. In some implementations, first 21 and second arm 22 are in planes that are not parallel—e.g., are at oblique angles—to each other.

Figure 3:
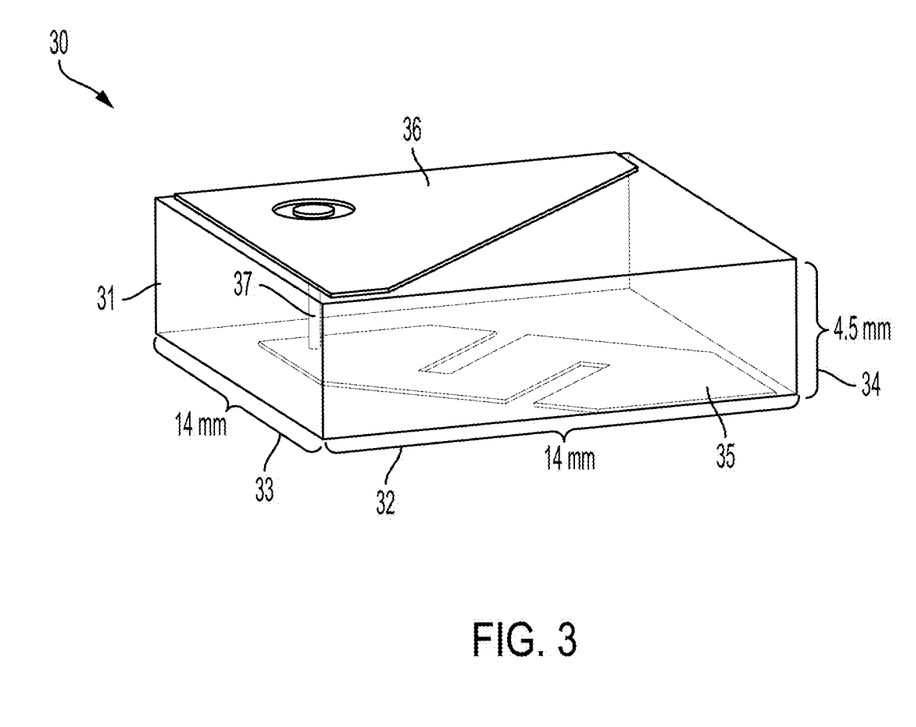
FIG. 3 is a perspective view of another example probe.

In some implementations, probe 20, or a variation thereof, may be embedded in a non-conductive substrate. For example, FIG. 3 shows another configuration of a probe 30 having a first arm 35, a second arm 36, and a conductor 37 which may have the same structure and function as conductor 26 described above. In this implementation, first arm 35 has a different serpentine configuration than probe 20 and is arranged somewhat diagonally relative to second arm 36, rather than the parallel configuration of FIG. 2. Second arm 36, this example, is substantially triangular instead of rectangular as in probe 20. The configuration of probe 30, the configuration of probe 20, or any of the probe configurations described herein or variations thereof may be to implement any of the techniques described herein.

In the example implementation of FIG. 3, example probe 30 is embedded in, housed in, or contained in a non-conductive substrate 31, such as fiber or ceramic. In some implementations, the dielectric constant of this substrate has a value that is 4 or less, 3 or less, 2 or less, or near 1. With higher dielectric constants, in some examples, RF signal energy may become concentrated in the substrate and signals may not propagate as well to/from the probe's first arm. Probe 30 is part of an overall structure having dimensions of less than 15 millimeters (mm) length by 15 mm width by 5 mm depth. In the non-limiting example of FIG. 3, the overall structure has dimensions of 14 millimeters (mm) 32 length by 14 mm width 33 by 5.5 mm depth/height 34. In this regard, when talking about dimensions, one may refer dimensions to the signal wavelength at the testing frequency, or to electrical dimensions, not the physical dimensions to have a better understanding how electrically large or small a probe or antenna is. For example, an implementation of the probe may be targeted at testing frequency ranging from 700 MHz (megahertz) to 6 GHz (gigahertz), which is the frequency range FR1 for a 5G sub-6 GHz system. At 700 MHz, the wavelength is 430 mm. A probe with a 15 mm physical dimension is 15/430 wavelength in electrical dimension. At that frequency the probe is considered to be electrically very small. At that electrical size, radiation outside the near-field region is inefficient. A probe this size is useful for very near-field measurements. At 6 GHz, the wavelength is 50 mm. The probe with physical dimension of 15 mm is 15/50 is 0.3 wavelength in electrical size, which is substantially larger. At that 6 GHz frequency, the probe will have more field radiated outward with better efficiency. The actual length of this probe is the sum of the length of the first arm (serpentine arm), the conductor, and the second arm. The overall length of this probe may then be longer than 15 mm. In this example, the length is about 28 mm. At the length, the electrical length is half wavelength for this antenna type (which is a dipole type antenna) and the probe efficiency may peak. In some implementations, a probe can be designed to be electrical larger at the upper portion of the frequencies of operation, where the probe length may reach ½ of the signal wavelength.

Each probe may be positioned relative to a corresponding antenna within the reactive near-field region of the antenna at a location and/or orientation that based on a least one of a transmission frequency of the antenna or a type of the antenna. More specifically, the optimal position of each probe may be dependent on the frequency of the signals being transmitted and the configuration of the antenna with which the probe is associated. For example, the size and shape of the antenna will affect where best to place the probe, since the size and shape of the antenna may affect the location, the size, and/or the shape of the antenna's reactive near-field region. Also, the signal frequency will affect how that signal propagates through the reactive near-field region and, therefore, the optimal location to place the probe relative to the antenna.

Figure 4:
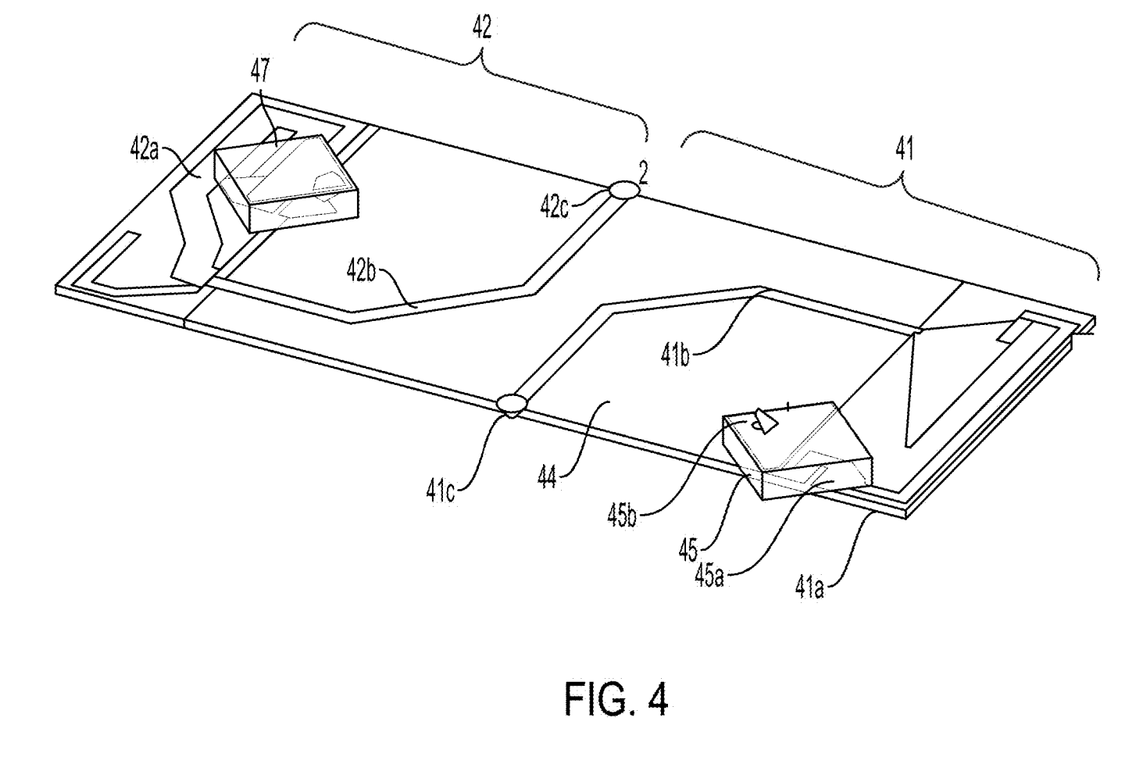
FIG. 4 is a perspective view of components of a DUT antenna.

Each probe may also be positioned relative to a corresponding antenna within the reactive near-field region of the antenna in order to eliminate, reduce, or minimize signal/current leakage between antenna ports on the DUT. In this regard, FIG. 4 shows components of antennas 41 and 42 for a DUT. Each antenna includes a respective arm 41a, 42a for transmitting and/or receiving RF signals, a respective electrical conductor 41b, 42b to transmit and/or receive signals to/from respective arm 41a, 42a, a respective port 41c, 42c through which signals are received and/or sent between the antenna and other components of the DUT, and an electrical ground plane 44 that is common to both of antennas 41 and 42.

Example probe 45 (such as probe 30 of FIG. 3) is positioned so that first arm 45a (e.g., first arm 35 of FIG. 3) is in proximity to/adjacent to antenna arm 41a in its reactive near-field region, but does not, or does not substantially, impinge on, cover, or be adjacent to, the electrical ground plane 44. For example, probe 45 may be positioned so that no more than a certain percentage (e.g., 20% or less, 10% or less, 5% or less, 1% or less, or any value in between these numbers) of first arm 45a impinges on, covers, or is adjacent to, the electrical ground plane 44. Such positioning is facilitated by the probe configuration in which the second arm 45b (e.g., arm 36 of FIG. 3) is away from and behind the first arm relative to the DUT antenna. By ensuring that first arm does not substantially impinge on, cover, or be adjacent to, the electrical ground plane 44, there is less chance that signal from probe 45 will induce current in the ground plane that can transfer to antenna 42 and corrupt any signal thereon. Such transferred current is referred to as leakage current and may be reduced using the probes described herein. This leakage current to the other MIMO antenna may degrade the MIMO channel by increasing cross-talk. This port leakage is a path for cross-talk.

Figure 9:
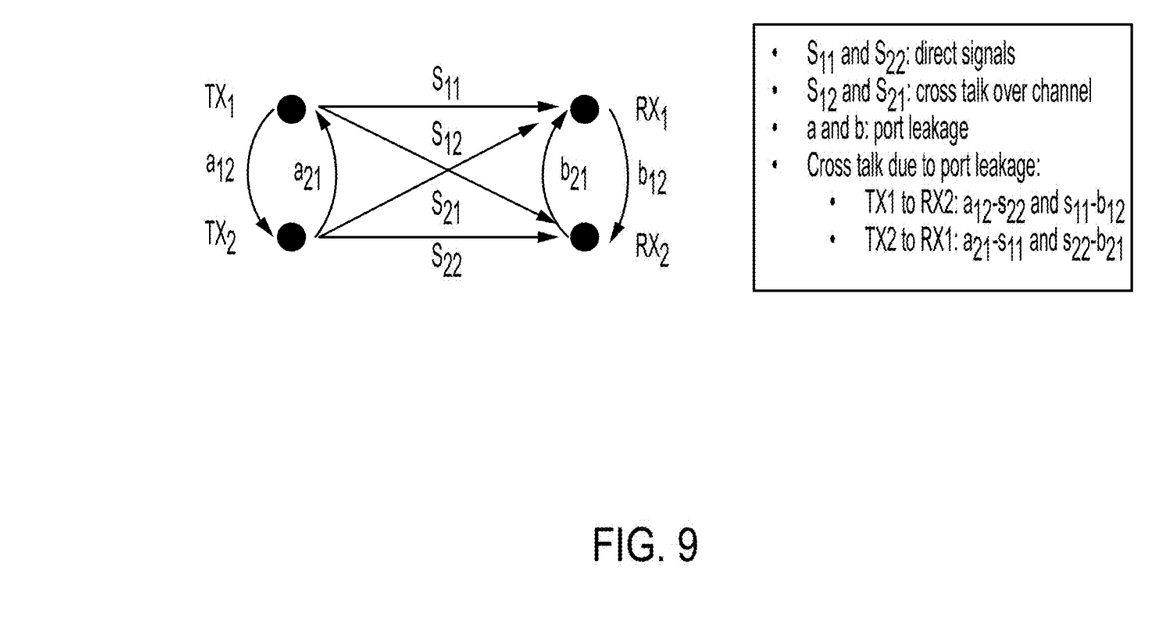
FIG. 9 is a block diagram showing sources of crosstalk in a MIMO system.

Multiple probes may be used to test MIMO systems or devices. in this regard, crosstalk is generally relatively low compared to the direct stream signal level for the reason that some example probes are poor radiators and coupling in the reactive near-field region is the only signal power transfer mechanism for some example probes. Existing near-field probes, such as short dipoles, have low port leakage, a, between probes ports and generally low cross-talk S12 and S21 in the channel, as shown in FIG. 9. However, there is another electro-magnetic mechanism that could affect overall cross-talk, namely port isolation between DUT antennas, b. This phenomenon is due to ground current that flows on a circuit board containing the antennas and a frame of the DUT. Crosstalk can then be substantial if this port leakage is significant (or port isolation is small), degrading the overall MIMO channel. For those devices with suboptimal MIMO channels, it may be difficult to obtain maximum throughput for production MIMO testing. FIG. 9 shows all the possible paths a signal can take for a 2×2 MIMO system from a transmitter antenna (TX) to a receiver antenna (RX). The probes described herein may reduce or eliminate these types of crosstalk.

Referring back to FIG. 4, probe 47 is also positioned so that its first arm is over the part 42a of antenna 42 that transmits the signal and so that its first arm does not substantially impinge on, cover, or be adjacent to, the electrical ground plane 44, thereby reducing the chances that probe 47 will induce current in ground plane 44 that can transfer to antenna 41, as described above In some implementations, a probe is sized based on a size and/or location of the antennas on the DUT such that communication between the probe and the antenna within the reactive near-field region inhibits wireless crosstalk between the probe and another antenna on the device. For example, as shown FIG. 4, a corresponding probe first arm 45a may have a size, for example a length so that it covers at a portion of transmitting part 41a of antenna 41, but that does not extend into ground plane 44. The width of first arm 45a may match or exceed the width of part 41a of antenna 41.

Figure 5:
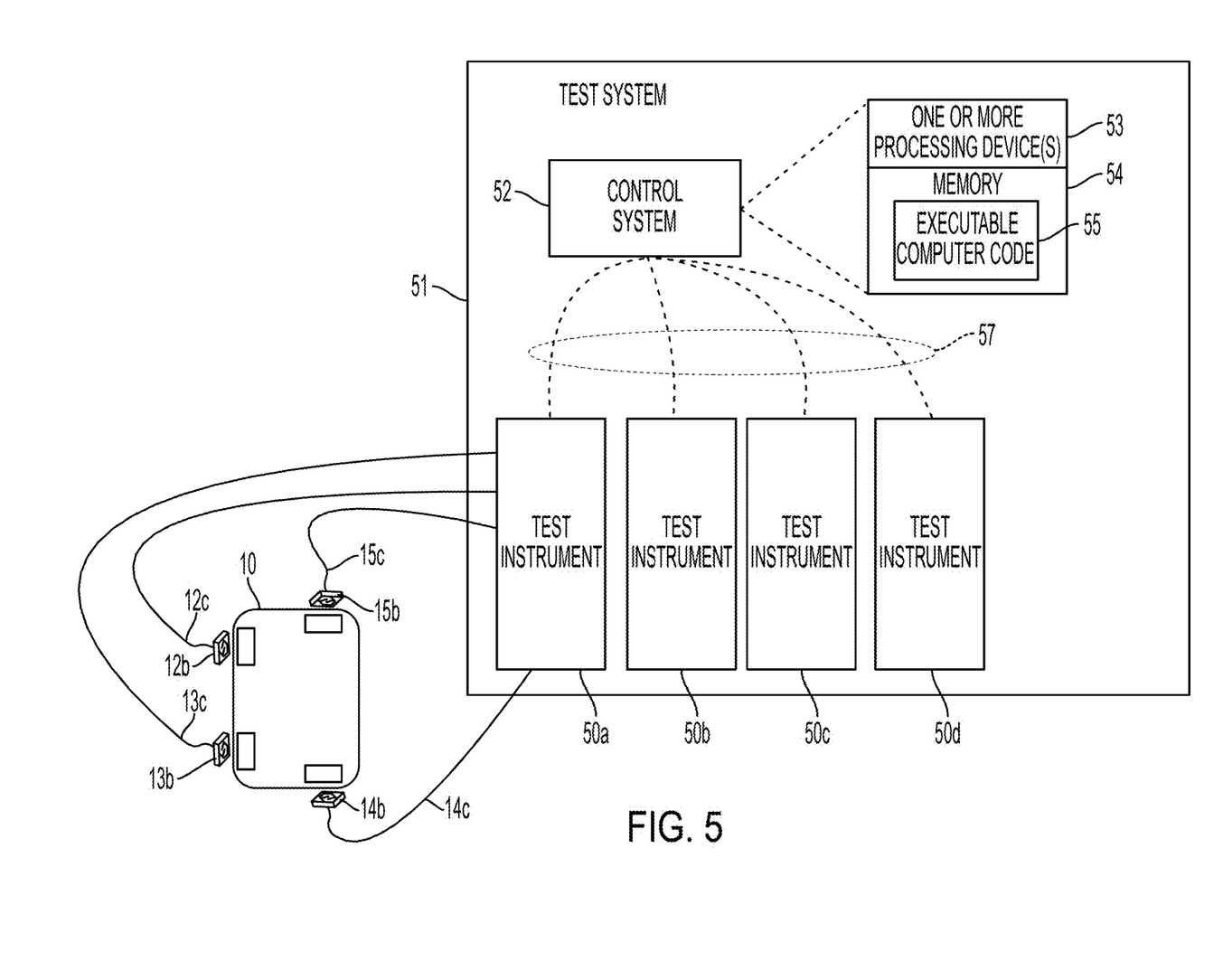
FIG. 5 is a block diagram of an example test system and DUT.

Referring to FIGS. 1 and 5, in this example, each probe connects to a respective signal feed line 12c to 15c. Each signal feed line connects to a test instrument 50a in a test system 51, as shown in FIG. 5. In some implementations, each signal feed line may be connected to switch (not shown) to route the signal feed line to a different test instrument based on a selection of the switch by control system 52 (described below).

An example test instrument 50a is a hardware device configured to send test signals to a DUT. The test signals may include stimuli, such as voltage or current, to elicit reactions in the DUT. Test instrument 50a is also configured to receive signals from the DUT, including response signals to the test signals, and to analyze those signals from the DUT to determine whether the DUT has passed for failed testing—for example, whether the reactions to the stimuli are what they were expected to be. For example, the test instrument may compare the response signal to one or more predefined thresholds and, based on the comparison, determine whether the DUT has passed for failed testing. An example test instrument includes a radio frequency (RF) test instrument. The signals sent to, and received by, such a test instrument include RF signals. In this case, the signal feed line may be or include coaxial cable or the like that is able to transport RF signals between the test instrument and the probe. At the probe, the RF signals from the signal feed line are output wirelessly to an antenna on the DUT, as described above. As also described above, wireless signals from the DUT are received at the probe and output to the test instrument via the signal feed line. The wireless signals to and/or from the probe may be over a static communication channel.

Test system 51 may include multiple test instruments 50a to 50d, which may be configured to perform one or more types of testing, such as RF testing, digital testing, parametric testing, or the like. Four are shown; however, there may be more or fewer than four test instruments in a test system of the type described herein. Test system 51 also includes a control system 52, which may be part of, or distributed across, one or more test instruments or separate from the test instruments. Control system 52 may include one or more processing devices 53, examples of which are described herein. Control system 52 also includes memory 54 storing computer code or instructions 55 that is/are executable by the one or more processing devices to control testing by executing one or more test programs and to control the probes described herein, for example, by outputting signals to the probes, selecting probes from which to receive signals, selecting a probe for use via a switch, and/or controlling probe movement. Control system also may control certain functionality of the test instruments, for example, to coordinate testing and/or to control what signals are output to the DUT. This control is depicted conceptually using dashed lines 57.

Figure 6:
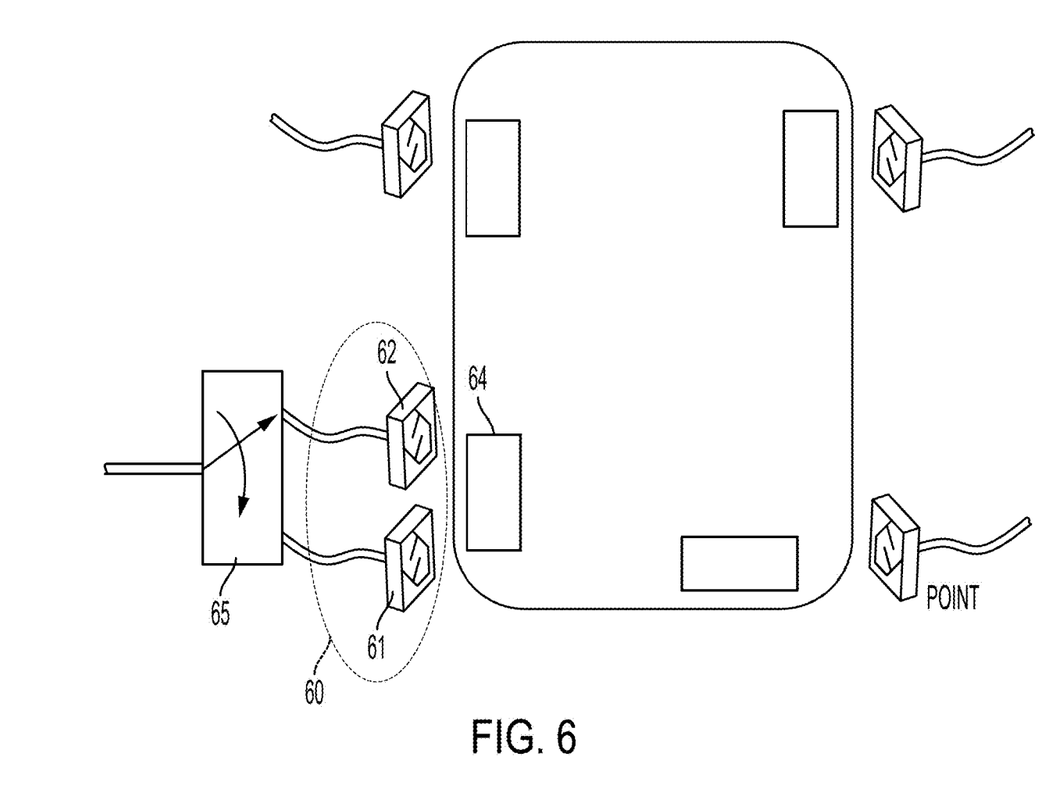
FIG. 6 is a block diagram showing an example DUT and example probes arranged relative to antennas on the DUT, including a switch to select probes.

In some implementations, there may be a single probe per antenna, as shown in the examples of FIGS. 1 and 5. In this example, each probe may cover (send and/or transmit signals in) all antenna frequency bands. Referring to FIG. 6, in some implementations, there may be multiple probes, or an array 60 of probes 61 and 62, positioned within the reactive near-field region of the same DUT antenna 64 to communicate to and from that antenna. For example, antenna 64 may be multiband antenna that sends and receives signals in different frequency bands. Probes 61 and 62 may be configured to communicate with antenna 64—that is, to send and/or to receive signals—in different frequency bands. That is, probe 61 may be configured to communicate with antenna 64 in a first frequency band only and 62 may be configured to communicate with antenna 64 in a second frequency band only, where the first and second frequency bands are different. Although two probes are shown, any appropriate number of probes may be positioned within the reactive near-field region of the same antenna, with the number of probes being dictated, at least in part, by the size of the reactive near-field region. Furthermore, each probe may be oriented—for example, angled—relative to antenna 64 in a way that best enables the probe to capture signals in the frequency band(s) from the antenna that the probe is configured to cover.

The test system may include a switch 65 that is controllable by control system 52 to select one of probes 61 or 62 to receive or to send a signal. Selection may be based on a test program run by the test system that is used to test the DUT. In some implementations, an RF combiner may be used in lieu of a switch. Depending on the number of probes associated with a single antenna, a hierarchy of multiple switches may be configured to select one of the probes for communication.

Figure 7:
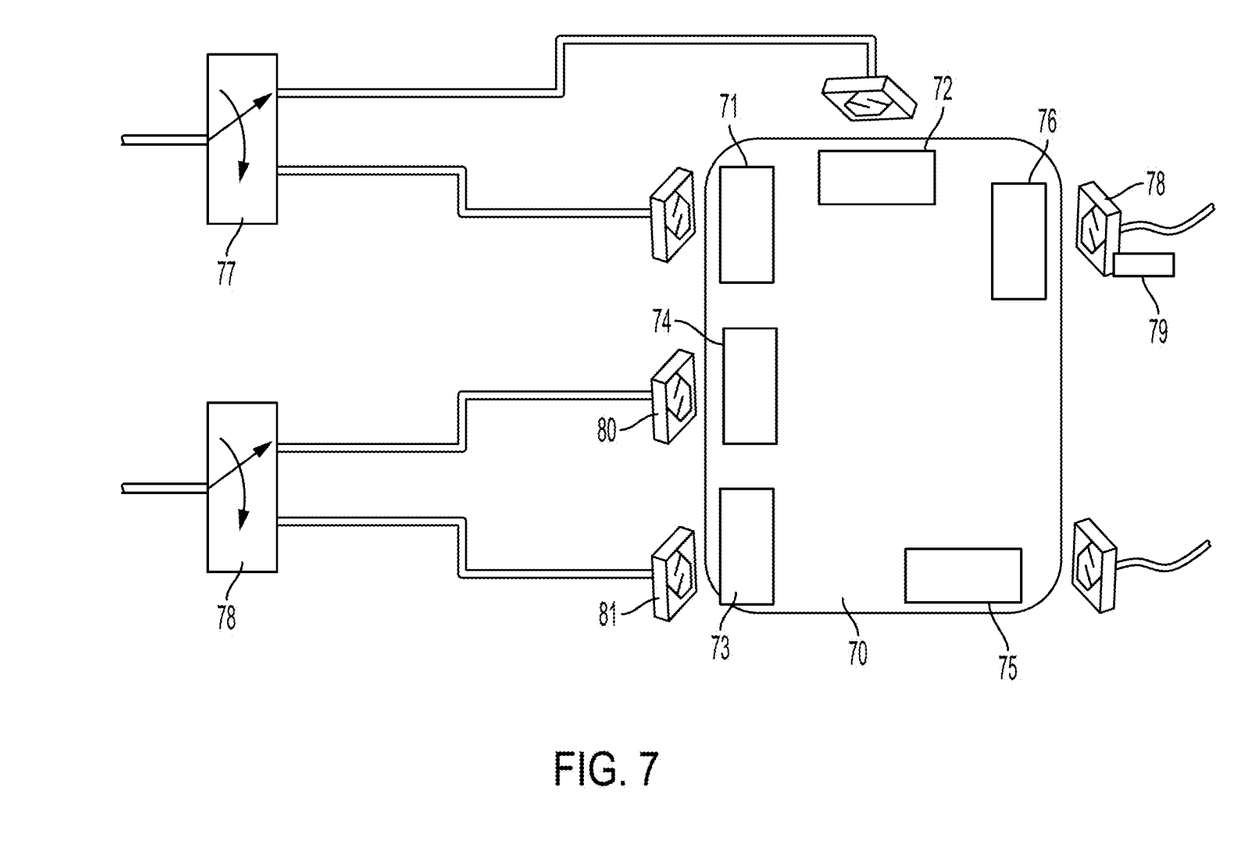
FIG. 7 is a block diagram showing an example DUT and example probes arranged relative to antennas on the DUT, including switches to select probes.

In the example implementation of FIG. 7, DUT 70 is configured with more than four antennas to cover all operating bands for its 4×4 MIMO operation. In this example, antenna 71 and antenna 72 cover all the bands for one MIMO stream, and antenna 73 and antenna 74 cover all the bands for a second, different MIMO stream, while antenna 75 covers all bands for a third, different MIMO stream, and antenna 76 covers all bands for a fourth, different MIMO stream. In this example, switch 77 is configured and controllable by the control system to select antenna 71 or antenna 72 for transmitting or receiving; and switch 78 is configured and controllable to select antenna 73 or antenna 74 for transmitting or receiving. Selection may be based on a test program run by the test system that is used to test the DUT.

In some implementations, one or more of the probes may be configured for movement relative to the DUT. For example, a probe 78 may be attached/connected to a microelectromechanical system (MEMS) actuator 79. The mems actuator 79 may be controllable by the test systems' control system 52 to control movement of the probe relative to the DUT based, for example, on instructions in a test program executed to test the DUT. Movement of the probe may be within the reactive near-field region and may be controlled, for example, so that the probe can be in a best position to receive signals at a particular frequency. To receive signals at a different frequency, the probe may be moved—for example, angled differently and/or moved towards or away from the DUT within the reactive near-field region—so that the probe can be in a best position to receive signals at the different frequency. Moveable probes may be combined with switches such as those shown in FIGS. 6 and 7. For example, probes 80 and 81 may be configured for movement relative to DUT 70 and one of those probes may be selected by controlling operation of switch 78 in the manner described previously.

Figure 8:
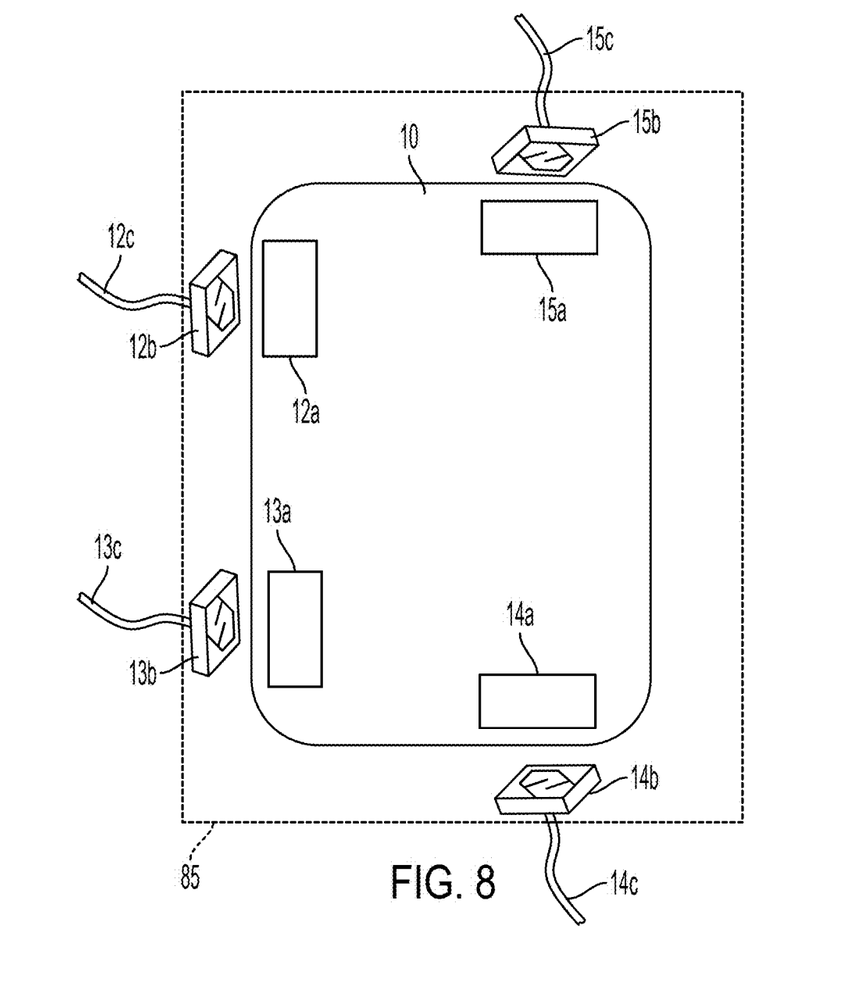
FIG. 8 is a block diagram showing an example DUT and example probes arranged relative to antennas on the DUT, including a testing enclosure housing, enclosing, or around the DUT and probes.

In some implementations, a DUT, such as DUT 10, and the probes 12b to 15b are enclosed in, housed in, or contained in a chamber or an enclosure 85, as shown in FIG. 8. Enclosure 85 may be anechoic. Such an enclosure or chamber may be metallic and used to prevent potential outside unwanted signals interfering with the test measurements. Furthermore, the inside walls of the enclosure may be covered with RF absorbing materials, which may be flat, pyramidal, convoluted, or have any appropriate shape and/or texture, that prevents or inhibits reflection of signals transmitting inside the enclosure, which can cause test interference. Given the relatively small size of some of the example probes described herein, in some cases, testing may proceed without a need to increase the size of the chamber or enclosure to accommodate the probes. So, legacy test equipment can still be used with the probes.

In some implementation, direct stream power imbalance from signals inside the reactive near-field region can be tuned out by either controlling the probe location and/or orientation and/or by adjusting the signal power of a probe-adjacent antenna without affecting levels of signals outside the reactive near-field region. In some implementations, cross stream signals from outside the reactive near-field region can be tuned to be small in magnitude relative to direct stream signals from a probe-adjacent antenna inside the reactive near-field region, as a result of the probe's lossy radiation property. Tuning may be controlled by the control system in combination with the test instrument providing the signals. The probe will be unable to detect cross stream signals from outside the reactive near-field region well, resulting in any detected signals being relatively small in magnitude. This may result in a MIMO channel matrix similar to that obtained from a conducted test setup in which feed lines, such as coaxial cables, connect the test instruments ports directly to the transmitting/receiving antenna ports of the DUT and in which the DUT antennas bypassed. In the example techniques descried herein, crosstalk may be reduced or eliminated. The obtained rank would be full-rank and the condition number would be small, which is a condition to obtain maximum throughput, as long as the received direct signal levels are above the system noise level.

The probes are described herein in the context of electrical signals. However, the probes may be used to transmit and to receive signals within a predefined distance from an antenna by interaction with local electromagnetic fields that are within a reactive near-field region of an antenna or other transmitting/receiving device.

All or part of the systems and processes described in this specification and their various modifications may be configured or controlled at least in part by one or more computers such as control system 52 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system for testing a device, the device comprising a multiple-input multiple-output (MIMO) wireless device comprising antennas, the antennas comprising at least two antennas for receiving or transmitting, the system comprising:
a test instrument electrically connected to a signal feed line comprised of (i) an inner conductor, (ii) an outer conductor, and (iii) a dielectric material between the inner conductor and the outer conductor; and
probes having wired connections to the test instrument over which signals are communicated between the probes and the test instrument, a probe of the probes being configured to communicate signals with an antenna of the antennas on the device wirelessly in a reactive near-field region of the antenna, the probe comprising:
a first arm configured for placement adjacent to at least part of the antenna to communicate the signals with the antenna wirelessly, the first arm being configured for electrical connection to the inner conductor of the signal feed line; and
a second arm physically away from the first arm, the signal feed line connecting to the second arm such that the outer conductor of the signal feed line is electrically connected to the second arm.

2. The system of claim 1, wherein the probes comprise at least two probes configured to communicate with the at least two antennas; and
wherein the test instrument is configured to send test signals to the at least two probes configured to communicate with the at least two antennas.

3. The system of claim 1, wherein the probes comprise at least two probes configured to communicate with the at least two antennas; and
wherein the test instrument is configured to receive responses to test signals from the at least two probes configured to communicate with the at least two antennas.

4. The system of claim 1, wherein at least part of the first arm is exposed relative to the second arm such that the at least part of the first arm is not covered by at least part of the second arm.

5. The system of claim 1, wherein the first arm is at least partly serpentine in shape.

6. The system of claim 1, wherein the first arm is configured for positioning adjacent to the antenna; and
wherein a dimension of the first arm along a length of the antenna is longer than a corresponding dimension of the second arm.

7. The system of claim 1, wherein the first arm is in a first plane and the second arm is in a second plane that is separate from the first plane; and
wherein the probe further comprises a conductor that electrically connects the first arm and the signal feed line.

8. The system of claim 1, wherein the first arm is in a first plane and the second arm is in a second plane that is separate from the first plane, the first plane and the second plane being parallel to each other.

9. The system of claim 1, wherein the first arm is in a first plane and the second arm is in a second plane that is separate from the first plane, the first plane and the second plane being at an oblique angle to each other.

10. The system of claim 1, wherein a combined length of the first arm and the second arm is a length that is less than a length of ½ of a wavelength of a signal that the probe communicates with the antenna, where a length of the first arm is measured along a curvature of the first arm, and where the combined length comprises a sum of the length of the first arm and a length of the second arm.

11. The system of claim 1, wherein the probe comprises a substrate and conductive metal embedded in the substrate, the conductive metal comprising the first and second arms, and the substrate having a dielectric constant of 3 or less.

12. The system of claim 1, wherein the probe is positioned relative to the antenna within the reactive near-field region based on at least one of a transmission frequency of the antenna or a type of the antenna.

13. The system of claim 1, wherein the probes comprise an array of probes configured to communicate signals with the antennas on the device wirelessly in a reactive near-field region of the antennas.

14. The system of claim 1, wherein the probes comprise an array of probes configured to communicate signals with one of the antennas on the device wirelessly in a reactive near-field region of the one of the antennas.

15. The system of claim 14, further comprising a switch for selecting a probe in the array, the test instrument being configured to select, via the switch, the selected probe in the array of probes by controlling the switch based on a frequency of communication to or from the one of the antennas.

16. The system of claim 1, wherein the probe is configured for movement relative to the antenna, the test instrument being configured to control the movement of the probe based on a frequency of communication to or from the antenna.

17. The system of claim 16, further comprising:
a microelectromechanical system (MEMS) actuator to which the probe is connected, the MEMS actuator being controllable by a control system to control the movement of the probe.

18. The system of claim 1, wherein the device comprises a ground plane; and
wherein the first arm is sized so as to cover at least part of the antenna but not extend over the ground plane.

19. The system of claim 1, wherein the probe comprises a structure having dimensions that are based on a wavelength of a signal transmitted to, or from, the probe.

20. The system of claim 1, wherein the probe is sized based on locations of the antennas on the device such that communication between the probe and the antenna within the reactive near-field region inhibits wireless crosstalk between the probe and another antenna on the device.

21. The system of claim 1, wherein the signals are communicated between the probes and the device over a static channel.

22. The system of claim 1, wherein the first arm is in a first plane and the second arm is in a second plane that is separate from the first plane; and wherein the second arm is configured so that, when the first arm is adjacent to the at least part of the antenna, the second arm is farther away from the antenna than the first arm.

23. The system of claim 2, wherein at least part of the first arm is exposed relative to the second arm such that the at least part of the first arm is not covered by at least part of the second arm.

24. The system of claim 1, wherein the first arm is at least partly meandering in shape.

25. The system of claim 2, wherein a combined length of the first arm and the second arm is a length that is less than ½ of a wavelength or less of a signal that the probe communicates with the antenna.

26. The system of claim 2, wherein the probe comprises a substrate and the first and second arms comprise a conductive metal embedded in the substrate, the substrate having a dielectric constant of 3 or less.

27. The system of claim 2, wherein the probe is a dipole, with the first arm corresponding to a first pole and the second arm corresponding to a second pole.

28. The system of claim 2, wherein the first arm is in a first plane and the second arm is in a second plane that is separate from the first plane; and wherein the probe further comprises a conductor that electrically connects the first arm and the signal feed line.

29. The system of claim 2, wherein the first arm is in a first plane and the second arm is in a second plane that is separate from the first plane, the first plane and the second plane being parallel to each other.

30. The system of claim 2, wherein the first arm is in a first plane and the second arm is in a second plane that is separate from the first plane, the first plane and the second plane being at an oblique angle to each other.

31. The system of claim 1, wherein the first arm is bent in multiple locations.

32. The system of claim 1, wherein the second arm is electrically connected to an electrical ground.

* * * * *